(12) United States Patent
Haffelder et al.

(10) Patent No.: US 7,231,895 B2
(45) Date of Patent: Jun. 19, 2007

(54) METHOD FOR OPERATING A CAMSHAFT ADJUSTING DEVICE

(75) Inventors: Joerg Haffelder, Bad Rappenau (DE); Oliver Krannich, Tamm (DE); Werner Mezger, Eberstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/532,853

(22) PCT Filed: Feb. 2, 2004

(86) PCT No.: PCT/DE2004/000154

§ 371 (c)(1),
(2), (4) Date: Apr. 27, 2005

(87) PCT Pub. No.: WO2004/079175

PCT Pub. Date: Aug. 16, 2004

(65) Prior Publication Data

US 2006/0096561 A1   May 11, 2006

(30) Foreign Application Priority Data

Mar. 6, 2003   (DE) ................. 103 09 717

(51) Int. Cl.
*F01L 1/34* (2006.01)
(52) U.S. Cl. ............... 123/90.15; 123/90.16; 123/90.17

(58) Field of Classification Search ............ 123/90.15, 123/90.17, 90.16, 90.31
See application file for complete search history.

(56) References Cited

U.S. PATENT DOCUMENTS 5,529,034 A     6/1996 Sone et al.
6,047,674 A *   4/2000 Kadowaki et al. ....... 120/90.15

FOREIGN PATENT DOCUMENTS

EP       1 363 007      11/2003

* cited by examiner

*Primary Examiner*—Thomas Denion
*Assistant Examiner*—Zelalem Eshete
(74) *Attorney, Agent, or Firm*—Kenyon & Kenyon LLP

(57) ABSTRACT

In a method for operating a camshaft adjusting device, using an actuating drive, the actual setting of a camshaft with respect to the rotation of the crankshaft is followed corresponding to a setpoint setting ascertained in a control unit. In response to the occurrence of a lasting system deviation between the actual setting and the setpoint setting, an error signal is generated. The error signal is designed in multiple stages as a function of the system deviation, different weightings being imputed to the individual stages of the fault indication. By this measure, the fault indications of different weightings may be processed. Faults that are not serious, but nevertheless require attention, may be treated separately from serious faults.

7 Claims, 1 Drawing Sheet

METHOD FOR OPERATING A CAMSHAFT ADJUSTING DEVICE

BACKGROUND INFORMATION

Camshaft adjusting devices are generally known in which, using an actuating drive, the actual setting of a camshaft with respect to the rotation of the crankshaft is followed corresponding to a setpoint setting ascertained in a control unit.

In this context, in principle, two types of camshaft adjusting devices are known. In one type, the generating of camshaft adjustment takes place independently of other assemblies. For this, for example, electrical camshaft actuators may be used. The other type of camshaft adjusting devices are those in which the energy required for generating the camshaft adjustment is fed directly by an ancillary component of the internal combustion engine, such as, for instance, the oil-pressure pump of the engine oil circulation.

Independent of whether a camshaft adjusting device has its own drive or one that is coupled to other devices, the problem arises that, when inaccurate regulation occurs, first, the exhaust emission behavior of the vehicle changes, and, secondly, also the vehicle behavior with respect to engine power and the response behavior change. In this context, it is known that, when too great an impairment of the exhaust emission behavior of the internal combustion engine occurs, a fault indication detectable by the driver is generated that prompts him immediately to look for a repair shop to eliminate the problem.

SUMMARY OF THE INVENTION

It is an object of the present invention to make possible a more discriminating reaction in response to the occurrence of system deviations between the setpoint value for the setting of the camshaft and the input actual value.

The object is attained according to the present invention.

In a method for operating a camshaft adjusting device, using an actuating drive, the actual setting of a camshaft with respect to the rotation of the crankshaft is followed corresponding to a setpoint setting ascertained in a control unit. In response to the occurrence of a lasting system deviation between the actual setting and the setpoint setting, an error signal is generated. According to the present invention, the error signal is designed in multiple stages as a function of the system deviation, different weightings being imputed to the individual stages of the fault indication. By this measure, the fault indications of different weightings may be processed. Faults that are not serious, but nevertheless require attention, may be treated separately from serious faults.

According to one preferred embodiment of the present invention, as a function of the stage of the fault indication, information of the driver takes place, via the occurrence of the fault. This measure achieves that, corresponding to the stage of the fault indication, the driver is informed in a discriminating manner concerning the occurrence of a fault. In this context, it is quite possible that lower stages of fault indications do not lead to information of the driver.

According to one embodiment of the present invention, with increasing system deviation a stage of higher weighting is reached. In this context, in an advantageous manner, at the latest, reaching the stage having the greatest weighting leads to the generation of a fault indication detectable by the driver. In an embodiment of the present invention, at least one stage of the fault signal is provided in which a fault indication is generated, that is stored in a fault memory that can be read out, but which, in driving operation, is not detectable by the driver. Such a fault indication may especially be stored in a fault memory that is able to be read out. The reading out may take place, in this context, via a diagnostic unit connected to the vehicle. This achieves that, when a fault occurs that requires maintenance, but carrying out the maintenance is not urgent, no indication of the fault occurs until the next stop at a repair shop. However, during a stop in a repair shop, as soon as a piece of maintenance equipment is attached, the appropriate fault indication is displayed. The corresponding maintenance measure can then be carried out. If, however, a fault occurs that is so important that it cannot be removed within the scope of regularly spaced stops at a repair shop, but requires checking ahead of time, a corresponding indication may be displayed to the driver, who may be prompted to look for a repair shop soon. In addition, a further stage may be provided whereby a warning indication is generated that is noticeable to the driver, and that prompts him to look for a repair shop without delay. That is the case if the fault is so important that an immediate removal of the fault or an immediate analysis of the source of the fault appears necessary. The second stage of the fault indication, in which looking for a workshop soon is advised, may be omitted, so that either only mute fault indications are generated, or, if necessary, a fault indication is generated that prompts the immediate searching out of the repair shop.

In the case of a camshaft adjusting device, a fault that prompts the immediate searching out of a repair shop is present if the continuing operation of the vehicle is not possible without endangerment of the vehicle itself. This is especially the case if, based on not achieving the setpoint setting, extremely unfavorable combustion conditions arise. Such a fault, however, may also be present if the combustion, at the given system deviation of the internal combustion engine, takes place in such an unfavorable manner that certain exhaust gas boundary conditions are no longer able to be maintained.

Faults that are less important, that is, for example, that result in only a slightly deteriorated exhaust gas quality or a slightly deteriorated running of the internal combustion engine, may lead to storing a corresponding fault value in a fault memory. Such faults may be fixed during a routine repair shop visit.

Faults that prompt a searching out of a repair shop, that are immediate, but not quite so that they have to be attended to without delay, may be seen in that, in the smooth operation properties of the engine, interference noticeable by the driver occur, based on the system deviation of the camshaft actuator. This applies at least to the point at which the fault is not yet so important that an immediate searching out of a repair shop appears indicated.

A vehicle according to the present invention has a camshaft adjusting device to which a control unit is assigned. The control unit has a computer, such as a miniprocessor, and to it a memory unit is assigned which may at least be read out. In the memory unit a program is stored that is able to be executed by the computer, that is used for carrying out a method according to the present invention. This memory unit designed according to the present invention, such as a read-only memory, ROM, has a computer program stored on it that may be executed on a computer or a microprocessor, that is used for carrying out a method according to the present invention.

DETAILED DESCRIPTION

Figure 1:
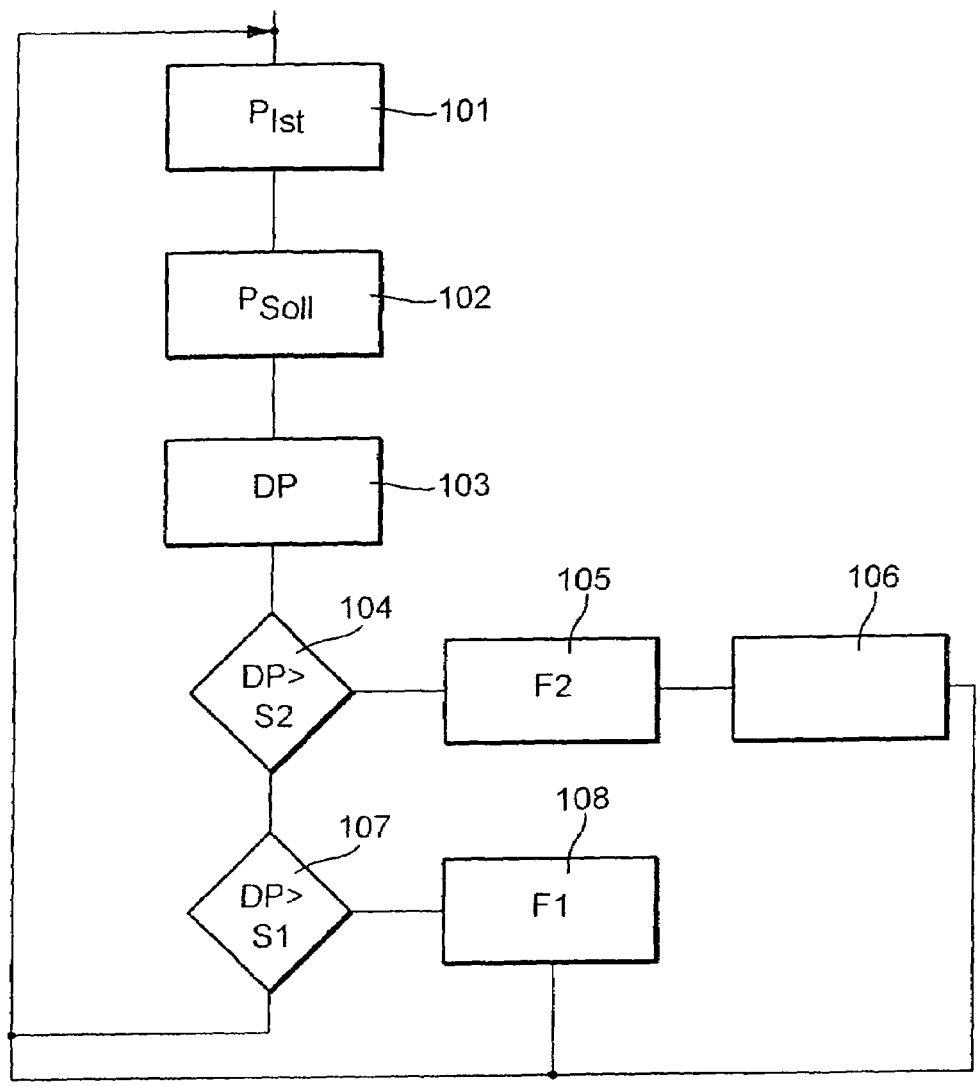
FIG. 1 shows the flow chart of a method according to the present invention.

FIG. 1 shows the flowchart of a method according to the present invention. In the method shown in FIG. 1, in this context, two stages of fault indication are differentiated from each other.

According to step 101 of the method, first of all the value for the actual setting of the camshaft $P_{actual}$ with respect to the crankshaft is recorded and supplied. Subsequently, according to step 102, the setpoint value of the position of camshaft actuator $P_{setpoint}$ is supplied. In step 103 of the method, the system deviation DP is ascertained from it. According to step 104 of the method, it is then checked whether system deviation DP is greater than a second threshold value F2. This second threshold value is the threshold for crossing over to a stage of a fault of higher weightiness. Thus, in the method it is first checked whether a fault of the greatest weightiness is present, which as a rule is distinguished by the greatest system deviation DP. If so, according to step 105 of the method, a consequent fault signal F2 is generated. According to step 106 of the method, the fault indication is subsequently output via an output unit. The output unit especially generates a warning signal perceptible by the driver, such as displaying an optically noticeable warning indication. The system then jumps back to step 101.

If, in step 104, it was not determined that threshold value S2 had been exceeded, the system goes over to step 107, and checks whether the system deviation DP exceeds a first threshold value, the first threshold value being developed for reaching a first fault stage. If the first threshold is not exceeded, one may assume an orderly operating camshaft actuator and the system jumps back to step 101. Otherwise, according to step 108, a first fault indication for reaching the first fault stage is generated, and this fault indication, for instance, in connection with additional data on the state of the camshaft actuator or the internal combustion engine as a whole, is stored in a fault memory. The fault memory is preferably a nonvolatile memory which may be written on, and which may be read out via an external device which, for instance, may be connectable to a data bus in the vehicle.

Figure 2:
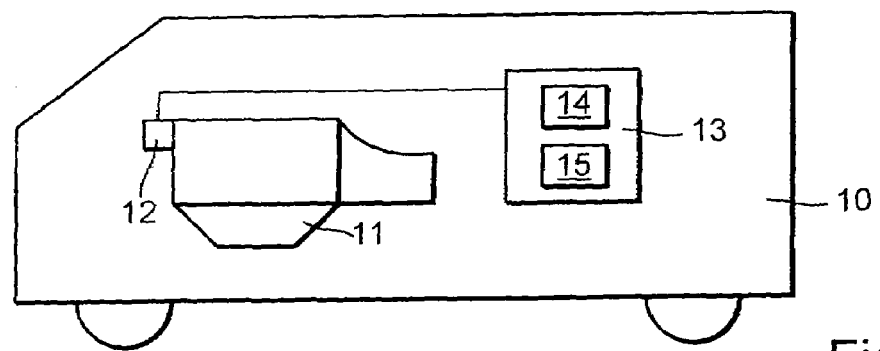
FIG. 2 shows the schematic representation of a vehicle designed according to the present invention.

In a schematic representation, FIG. 2 shows a vehicle 10 which has an internal combustion engine. The internal combustion engine has available to it a camshaft actuator 12 for adjusting the relative position of the camshaft with respect to the rotary motion of the crankshaft. In this context, the camshaft actuator 12 is activated by a control unit 13, which includes a computer 14 that carries out the control program for activating the camshaft actuator and also carries out the test method according to the present invention. For this, a computer program is stored in a memory 15 of control unit 13, and it may be executed on microprocessor 14.

What is claimed is:

1. A method for operating a camshaft adjusting device, using an actuating drive, the method comprising:

making an actual setting of a camshaft with respect to a rotation of a crankshaft to follow corresponding to a setpoint setting ascertained in a control unit;

if there is a system deviation between the actual setting and the setpoint setting, forming a multi-stage fault signal as a function of the system deviation; and imputing different weightings to individual stages of a fault indication, wherein the fault signal is generated if the system deviation satisfies a threshold condition, and wherein a stage of greater weighting is reached with increasing system deviation.

2. The method according to claim 1, wherein information of a driver concerning an occurrence of a fault takes place as a function of a stage of the fault indication.

3. The method according to claim 1, further comprising generating a fault indication perceptible by a driver at the latest when a stage having the greatest weighting is reached.

4. The method according to claim 1, further comprising generating fault indications, perceptible by a driver, that are different from each other, as a function of a stage of the weighting, a fault indication, that prompts an immediate searching out of a repair shop, being generated at the latest when a stage having the greatest weighting is reached.

5. The method according to claim 1, wherein at least one stage exists in which a fault indication is generated that is stored in a fault memory in a way in which it can be read out, but is not perceptible to a driver during driving operation.

6. A control unit for operating a camshaft adjusting device of a vehicle, the control unit including a computer to which a memory device is assigned, the memory device storing a program that is able to be executed by the computer, for carrying out the following method:

making an actual setting of a camshaft with respect to a rotation of a crankshaft to follow corresponding to a setpoint setting ascertained in the control unit;

if there is a system deviation between the actual setting and the setpoint setting, forming a multi-stage fault signal as a function of the system deviation; and imputing different weightings to individual stages of a fault indication, wherein the fault signal is generated if the system deviation satisfies a threshold condition, and wherein a stage of greater weighting is reached with increasing system deviation.

7. A memory device storing a program that is able to be executed by a processor for carrying out the following method for operating a camshaft adjusting device:

making an actual setting of a camshaft with respect to a rotation of a crankshaft to follow corresponding to a setpoint setting ascertained in a control unit;

if there is a system deviation between the actual setting and the setpoint setting, forming a multi-stage fault signal as a function of the system deviation; and imputing different weightings to individual stages of a fault indication, wherein the fault signal is generated if the system deviation satisfies a threshold condition, and wherein a stage of greater weighting is reached with increasing system deviation.

* * * * *